(12) United States Patent
Porat et al.

(10) Patent No.: US 10,103,585 B2
(45) Date of Patent: Oct. 16, 2018

(54) REGULATED LOAD MODULATION CIRCUIT AND METHOD FOR PRODUCING REGULATED LOAD MODULATION SIGNALING

(71) Applicant: Intel IP Corporation, Santa Clara, CA (US)

(72) Inventors: Shahar Porat, Geva Carmel (IL); Niv Amsalem, Petach Tikva (IL)

(73) Assignee: Intel IP Corporation, Santa Clara, CA (US)

( * ) Notice: Subject to any disclaimer, the term of this patent is extended or adjusted under 35 U.S.C. 154(b) by 261 days.

(21) Appl. No.: 14/974,887

(22) Filed: Dec. 18, 2015

(65) Prior Publication Data

US 2017/0179729 A1 Jun. 22, 2017

(51) Int. Cl.
*H02J 7/02* (2016.01)
*H02J 50/80* (2016.01)
*H02J 50/12* (2016.01)

(52) U.S. Cl.
CPC .............. *H02J 50/80* (2016.02); *H02J 7/025* (2013.01); *H02J 50/12* (2016.02)

(58) Field of Classification Search
CPC .. H02J 5/005; H02J 7/025; H02J 17/00; H02J 50/12; H02J 50/80
USPC ........................................................ 307/104
See application file for complete search history.

(56) References Cited

U.S. PATENT DOCUMENTS

| 2010/0013321 A1* | 1/2010 | Onishi | G08C 17/04 307/104 |
| 2011/0169446 A1* | 7/2011 | Kondo | H01M 10/4257 320/108 |
| 2011/0210620 A1* | 9/2011 | Shinoda | H02J 5/005 307/104 |
| 2012/0235636 A1* | 9/2012 | Partovi | H02J 7/025 320/108 |
| 2014/0265897 A1* | 9/2014 | Taipale | H05B 37/02 315/200 R |
| 2014/0347027 A1* | 11/2014 | Jayaraj | H02M 3/1563 323/282 |
| 2015/0091523 A1* | 4/2015 | Satyamoorthy | H02J 7/025 320/108 |

(Continued)

*Primary Examiner* — Levi Gannon
(74) *Attorney, Agent, or Firm* — Eschweiler & Potashnik, LLC (57) ABSTRACT

A load modulation circuit includes a resonator circuit configured to resonate based on a received charging power and produce a resonance output signal based thereon, and a rectifier circuit configured to receive the resonance output signal and convert the resonance output signal to a rectified voltage signal. The load modulation circuit further includes a sensor circuit configured to sense the rectified voltage signal and generate a control signal based on the rectified voltage signal and a target power range associated with a change in conducting power of the load modulation circuit during a load modulation. Lastly, the load modulation circuit includes a controllable current source circuit configured to generate a controlled current based on the control signal, wherein the controlled current modulates a load of the load modulation circuit while concurrently maintaining a change in total conducting power at an output of the rectified circuit within the target power range.

19 Claims, 4 Drawing Sheets

(56) References Cited

U.S. PATENT DOCUMENTS

2015/0188442 A1* 7/2015 Kesterson ......... H02M 3/33523
                                                363/21.15
2015/0229135 A1   8/2015 Porat et al.
2016/0268815 A1*  9/2016 Lee ..................... H02J 50/10

* cited by examiner

REGULATED LOAD MODULATION CIRCUIT AND METHOD FOR PRODUCING REGULATED LOAD MODULATION SIGNALING

BACKGROUND

Load modulation refers generally to a systematic altering of a load impedance. In one instance load modulation may be employed to improve linearity in a circuit such as in a power amplifier, and in another instance load modulation may be utilized to signal back to a transmitting arrangement some piece of information. One application for such "signaling back" is wireless power transfer (WPT). One organization that has produced a specification for WPT systems is the Alliance for Wireless Power (A4WP). The A4WP specification (called "Rezence") is designed to meet user experience and industrial design requirements for portable hand-held devices.

A basic wireless charging system may include a wireless power transmitter unit (PTU) and a wireless power receiving unit (PRU). For example, a PTU may include a transmit (Tx) coil, and a PRU may include receive (Rx) coil. Magnetic resonance wireless charging may employ a magnetic coupling between the Tx coil and the Rx coil. A common issue seen in these types of wireless charging systems is during an initialization phase. In an initialization phase, the PTU attempts to detect whether a valid PRU is being placed on or near the Tx coil of the PTU. For example, the PTU may be configured to sense load variations during a first predetermined beacon period to determine whether a device is on, or near the Tx coil. The load variations may be caused by a PRU being placed on or near the PTU, but may also be caused by a conductive metal of an object, such as a coin, or a device having a non-valid receiving coil in terms of a wireless charging protocol of the PTU.

For example, a PTU may power on during the first predetermined beacon period to detect whether a load associated with inductive coupling of the Tx coil by an object has changed. If a change in load is sensed, for example, compared to the previous period, the PTU will power on for a second predetermined beacon period that is relatively longer than the first predetermined beacon period. For example, the first predetermined beacon period may be 30 milliseconds. The first predetermined beacon period may be relatively short in comparison to a longer second beacon period of 100 milliseconds configured to follow the short beacon.

DETAILED DESCRIPTION

The systems and methods of this disclosure are described with reference to the attached drawing figures, wherein like reference numerals are used to refer to like elements throughout, and wherein the illustrated structures and devices are not necessarily drawn to scale.

A device and method are disclosed that are directed to a load modulation circuit and method for producing regulated load modulation signaling.

Figure 1:
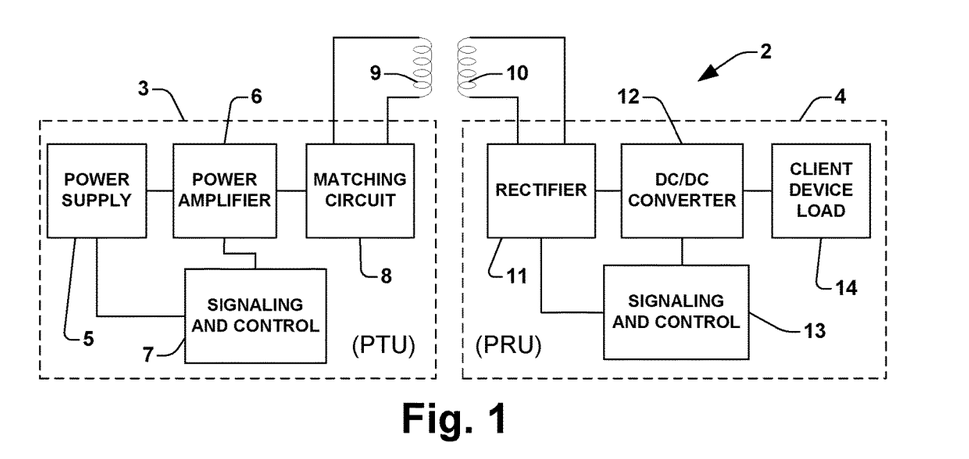
FIG. 1 is a block diagram illustrating wireless charging system.

An example of a wireless charging system is illustrated in FIG. 1 at reference numeral 2, and includes a power transmission unit (PTU) 3 and a power reception unit (PRU) 4. The PTU 3 includes a power supply 5, a power amplifier 6, a signaling and control circuit 7, a matching circuit 8 and a transmitting coil or resonator 9. The PRU 4 includes a receiving coil or resonator 10, a rectifier 11, a DC/DC converter 12, a signaling and control circuit 13 and a client load device 14. The PTU generates a signal, for example, at a frequency of 6.78 MHz in the HF portion of the radio spectrum. The transmitted power is received by the receiving resonator 10 and is rectified by the rectifier 11 to generate a DC voltage. Once rectified the DC/DC converter 12 operates to convert the DC voltage to the required voltage level.

The present disclosure relates generally to a circuit and method for performing load modulation at a power receiving unit (PRU). As highlighted above, magnetic resonance wireless charging systems may employ a magnetic coupling between a power transmitting unit (PTU) having a transmit (Tx) coil, and a PRU having a receive (Rx) coil. However, in order to save power, particularly in mobile applications, the PTU may power off when the PTU is not coupled to a PRU. The PTU may only power on during predetermined periods of time in order to sense any change in a load indicating a PRU has potentially been placed on, or near the PRU for charging. The predetermined periods of time may be referred to herein as beacons. During an initialization phase, the PTU needs to detect if a valid PRU exists, and only then transmit energy to charge a device having the valid PRU.

In A4WP Wireless Charging, load modulation signaling is employed to deliver data from the Power Receiver Unit (PRU) to the Power Transmit Unit (PTU). More particularly, in one portion of the specification such as initialization, a PRU may request "beacon extension" in order to get more power for a longer time period to complete the A4WP registration phase between the PRU and the PTU.

The long beacon extension request is sent from the PRU back to the PTU using the load modulation technique. In the case of the A4WP specification, the load modulation signaling must fall within a target power range of $0.5\text{ W} < \Delta P < 1.1\text{ W}$. This means that during load modulation signaling, a change in the total conducting power ($\Delta P$) should fall within a predetermined target range. The present disclosure is directed to a circuit and method to provide regulated load modulation signaling. While the disclosure provides an example of wireless charging with respect to the A4WP specification, it should be understood that any predetermined target power range is contemplate, as well as load modulation signaling in other circuit applications outside of wireless charging.

Figure 2:
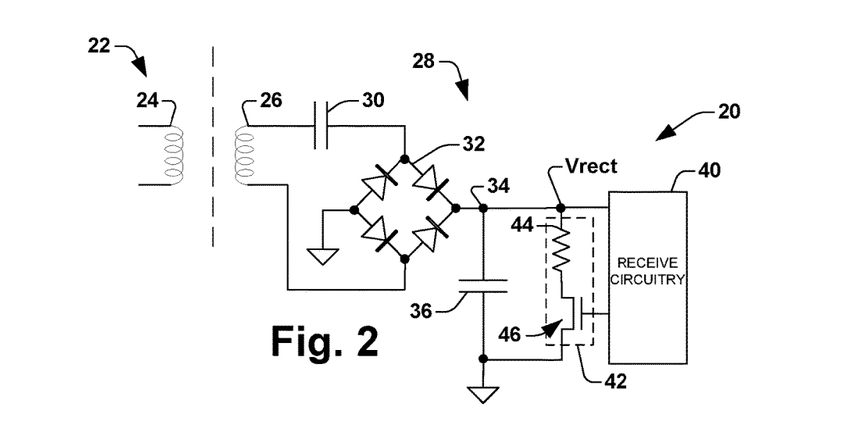
FIG. 2 is a schematic diagram illustrating a wireless charging system that employs load modulation.

FIG. 2 is a schematic diagram of a wireless charging system 20 that illustrates issues associated with load modulation. The PTU 22, inter alia, has a transmission coil 24 that magnetically inductively couples with a reception coil 26 of the PRU 28. The coupling induces an AC reception current in a reception coil 26, causing an alternating charging of a resonance capacitor 30, and thus an alternating voltage at an input of a rectifier circuit 32. A large capacitor 36 substantially smooths out the time varying nature of the rectifier output voltage, resulting in a generally DC at the rectifier output (Vrect) 34.

Still referring to FIG. 2, a receiver circuit 40 employs a load modulation circuit 42 composed of a resistor 44 and a switch (e.g., an NMOS transistor) 46 to signal back information from the PRU 28 to the PTU 22. The load modulation circuit 42 does this by switching on the transistor 46, creating a current pulse ($I_L$) through the resistor 44. The change in the total conducting power ($\Delta P$) during such load modulation is then $\Delta P = Vrect \times I_L$. Therefore the value of Vrect and resistor 44 dictate the change in total conducting power ($\Delta P$). Unfortunately, in various wireless charging systems Vrect can vary over a substantial range of voltages, for example, between 5V and 35V. Such variations in Vrect can be due to the relative locations of the PTU and the PRU, the industrial design of the charger, as well as other parameters. In any event, due to such variations in Vrect the load modulation circuit 42 will see significant change in total conducting power that can result in a non-compliance of a specification (e.g., 0.5 W<$\Delta P$<1.1 W). For example, if the resistor 44 value is chosen to conduct 0.75 W during load modulation at Vrect=5V, $R_{44}$=33.3Ω. However, at Vrect=35V and $R_{44}$=33.3Ω, the total change in conducting power ($\Delta P$) is 36.7 W, which greatly exceeds the A4WP specification.

Figure 3:
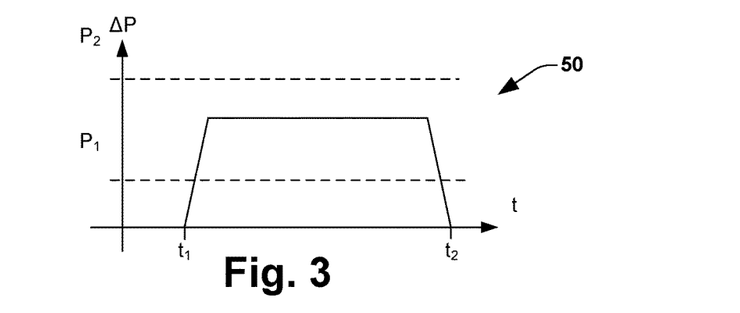
FIG. 3 is a waveform diagram illustrating a change in conductive power associated with a load modulation signaling in a system as illustrated in FIG. 2.

FIG. 3 is a waveform diagram that illustrates a change in total conducting power ($\Delta P$) during a load modulation. Referring back to FIG. 2, when the receive circuitry 40 turns the transistor 46 on at $t_1$, a current pulse conducts through the resistor 44 causing a change in power associated with the voltage Vrect and the current $I_L$. In FIG. 3, a current pulse 50 is shown having a change in total conducting power ($\Delta P$) within a target power range (i.e., $P_1 < \Delta P < P_2$). In one embodiment the target power range is 0.5 W<$\Delta P$<1.1 W based on the A4WP specification, however, other ranges associated with other circuit applications may be employed and are contemplated as falling within the scope of the present disclosure. As discussed above, for substantial variations in Vrect, the load modulation system 20 of FIG. 2 does not satisfy the predetermined power target range.

Figure 4:
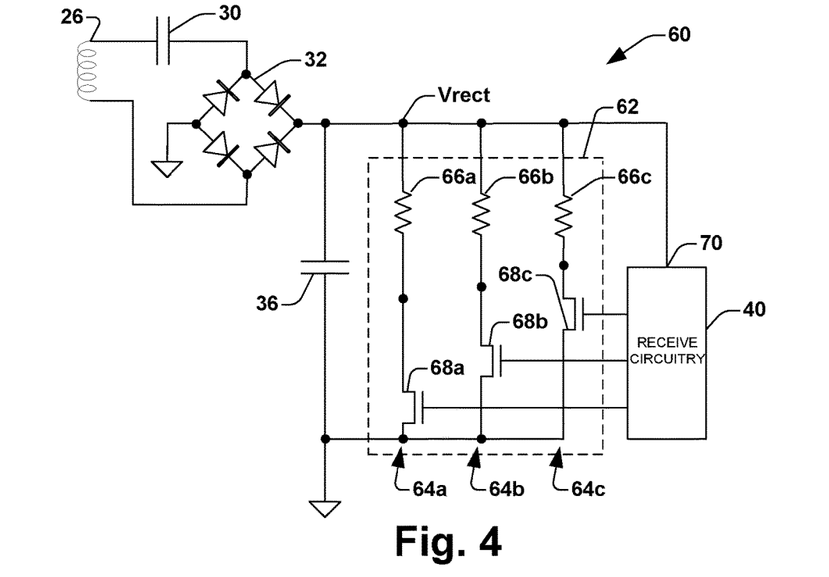
FIG. 4 is a schematic diagram illustrating a wireless charging system that employs load modulation with multiple paths for differing ranges of rectified voltage.

FIG. 4 is a load modulation system 60 having a load modulation circuit 62 that replaces the load modulation circuit 42 of FIG. 2. The load modulation circuit 62 includes three branches 64a-64c that each have a resistor 66a-66c and a transistor 68a-68c, respectively. The receive circuitry 40 receives Vrect as an input at 70 and compares Vrect to three voltage sub-ranges to determine what sub-range of voltages Vrect falls within. Depending on that determination, one of the three branches 64a-64c is activated by turning on the corresponding transistor, while the other two branches are deactivated by keeping the associated transistors turned off. Each path 64a-64c has a resistor 66a-66b, respectively, having a different resistance value which varies the magnitude of the respective current pulse $I_L$ during load modulation. More particularly, for a high sub-range of Vrect, the branch having a larger resistance 66 is employed so that $I_L$ is reduced, thus keeping $\Delta P$ within a desired predetermined target power range. This array of resistor 66a-66c and switches 68a-68c takes a substantial number of circuit components, particularly, if a significant number of branches are deemed necessary.

Another solution may employ a pulse width modulation on the switching of the transistor 46 during the load modulation, however, such a solution results in an AC current on the DC current across the resistor 44. This AC current due to the pulse width modulation of the switch 46 during load modulation results in $\Delta P$ spikes that cause non-compliance with a desired predetermined power target range.

Figure 5:
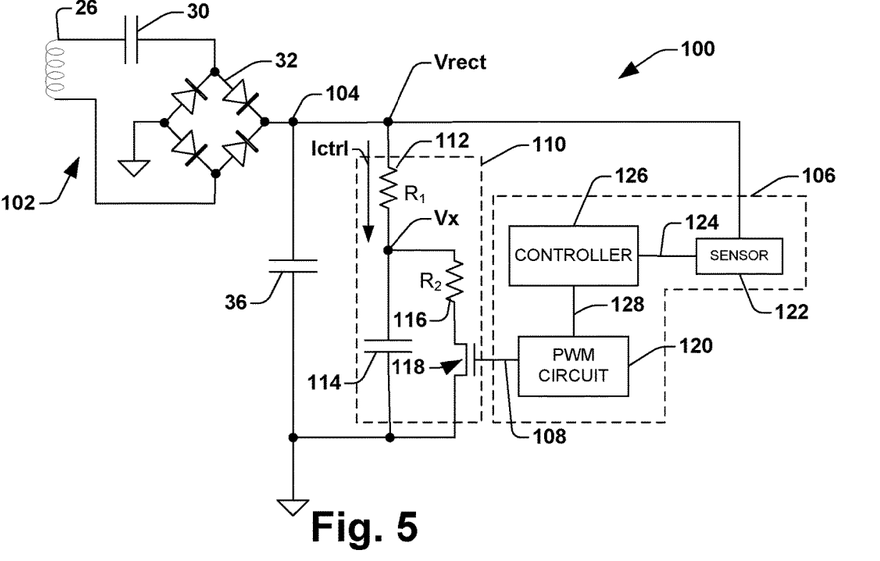
FIG. 5 is a schematic diagram illustrating a wireless charging system that employs load modulation having a controllable current source that conducts as a function rectified voltage according to one embodiment.

FIG. 5 is a load modulation system 100 according to one embodiment of the disclosure. The load modulation system 100 comprises a resonator circuit 102 that includes the receiver coil 26 and the resonance capacitor 30. The load modulation system 100 further comprises a rectifier circuit 32 that receives a resonance output signal from the resonator circuit 102 and operates to convert the resonance output signal to a rectified voltage signal at a node 104. Still referring to FIG. 5, the load modulation system 100 further includes a sensor circuit 106 that is configured to sense the rectified voltage signal and generate a control signal 108 based on the rectified voltage signal and a target power range. In one embodiment the target power range is associated with a change in conducting power of the load modulation circuit during load modulation.

Still referring to FIG. 5, the load modulation system 100 further comprises a controllable current source circuit 110. The controllable current source circuit 110 is configured to receive the control signal 108 and generate a controlled current Ictrl based on the control signal 108. The generated controlled current Ictrlont modulates a load of the load modulation system 100 while concurrently maintaining a change in total conducting power at an output of the rectified circuit within the target power range.

In one embodiment of the disclosure, the controllable current source circuit 110 comprises a first resistance $R_1$ 112 that is connected in series with a pair of parallel paths, forming a parallel circuit, as illustrated in FIG. 5. In one of the paths (e.g., a first branch) a first capacitance 114 couples to the first resistance $R_1$ 112, and in another path (e.g., a second branch) comprising a series coupled second resistance $R_2$ 116 and a switch 118. In one embodiment, the switch 118 comprises an NMOS transistor, however, other switches may be employed and all such alternatives are contemplated as falling within the scope of the disclosure.

Figure 6:
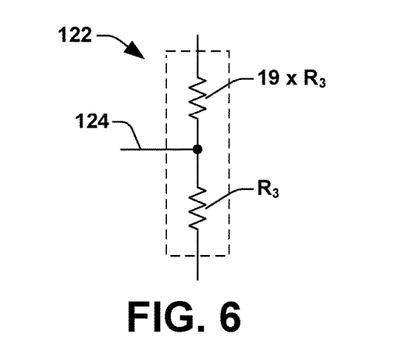
FIG. 6 is a schematic diagram of a sensor circuit for sensing a rectified voltage in a load modulation circuit according to one embodiment.

Still referring to FIG. 5, the sensor circuit 106, in one embodiment, comprises a pulse width modulation (PWM) circuit 120 that is configured to generate the control signal 108 (e.g., a PWM signal). In one embodiment the PWM circuit 120 generates the control signal 108 having a duty cycle that is based on the rectified voltage Vrect of node 104 and the desired predetermined target power range. The sensor circuit 106 further comprises a sensing device or a sensor 122 that receives the rectified voltage Vrect and generates an output signal 124 indicative of a value of the rectified voltage Vrect. In one embodiment the sensing device 122 comprises a voltage divider circuit that outputs a voltage that is a ratio of Vrect. For example, as illustrated in FIG. 6, a voltage divider circuit may comprise a first resistor $R_3$ connected in series with a second resistor $19 \times R_3$ to generate a sampled voltage which is a value that is a ratio of Vrect (i.e., $V_{124}$=Vrect/20), in one embodiment.

The sensor circuit 106 may further comprise a controller 126. In one embodiment the controller 126 is connected to a memory (not shown) or has its own internal memory to store instructions that when executed causes the controller to operate in one of two modes. In a first mode, based on a desired power change ($\Delta P$) that falls, for example, at about a midpoint of the target power range, for a given value of $R_1$ 112 and $R_2$ 116, a duty cycle value is calculated by the controller 126 and provided to the PWM circuit 120 as a duty cycle control value 128 which is used by the PWM circuit 120 to drive the switch 118 at that duty cycle. In a second mode of operation, the controller 126 may calculate an initial duty cycle in a manner similar to that highlighted above, or calculated an estimated duty cycle using a different methodology. Alternatively, based on the associated rectified value 124, a best first guess of a duty cycle may be selected using, for example, a look-up table (LUT). Once the initial duty cycle is selected, the controller 126 in the second mode continues to sample Vrect via the sensing device 122 or a metric associated therewith, and compare the associated value with a predetermined threshold. In one embodiment, if the metric exceeds the threshold the controller 126 uses a signal 128 to reduce the duty cycle of the switch 118, and if the metric falls below the metric the controller 126 uses the signal to increase the duty cycle of the switch 118. In the above manner, the load modulation system 100 operates to dynamically control the current Ictrl during load modulation based on the rectified voltage value and a target power range.

Figure 7:
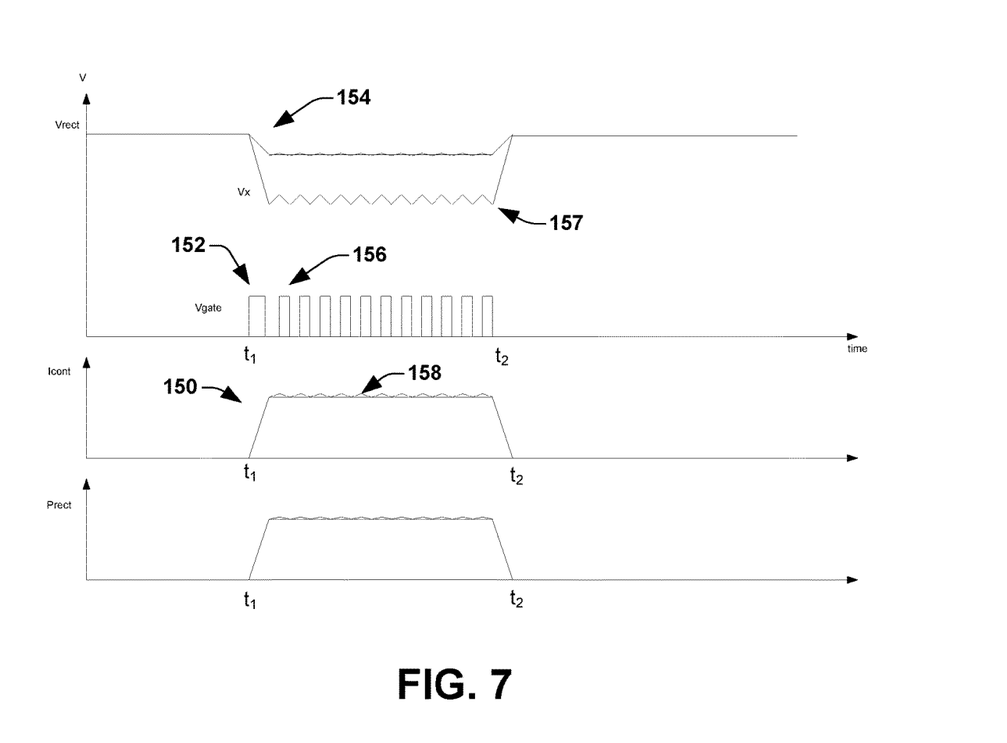
FIG. 7 is a series of waveform diagrams illustrating various node voltages, current and power conduction in operation of the load modulation system of FIG. 5 according to one embodiment.

Further details regarding an operation of the load modulation system 100 may be more fully understood in conjunction with the voltage, current and power waveforms in FIG. 7. At times before $t_1$, no load modulation signaling is being performed and thus the controller 126 of FIG. 5 has the switch 118 turned off. At this time, the full rectified voltage Vrect is across the capacitor 36 of FIG. 5, and such capacitor is charged. At time $t_1$, based on instructions received by the controller 126, for example, a signaling back to the PRU (or other type circuit) is initiated via a current pulse 150 (e.g., an extended beacon pulse as discussed earlier). At time $t_1$, the voltage Vrect at node 104 may vary over a significant range of voltage, for example, 5V-35V. Based on a value of the rectified voltage, the sensing system 106 operates to determine an initial duty cycle for the switch 118. In one embodiment a determination is made as follows. The power consumed by the load modulation circuit is given by:

$$P\text{rect}=V\text{rect}\times(V\text{rect}-Vx)/R_1,$$

wherein Vx is the voltage at the node between $R_1$ and $R_2$, as illustrated in FIG. 5. The desired value of Vx (i.e., Vx_desire) is provided by:

$$Vx\_\text{desire}=V\text{rect}-(P\text{rect}\times R_1)/V\text{rect}.$$

To actually produce the calculated Vx_desire, we calculate the duty cycle as follows:

$$R\text{desire}=V\text{rect}^2/P\text{rect}, \text{ and}$$

$$V\text{gate(duty cycle)}=(R_1+R_2)/R\text{desire}.$$

The initiation of the switch 118 with this initial calculated duty cycle is shown at 152 in FIG. 7. The activation of the switch 118 causes a controlled conduction of current Ictrl through $R_1$ 112. This also causes a partial discharge of the capacitor 36, which is seen in a slight decrease in the rectified voltage Vrect at 104. This change in Vrect is further sensed by the sensor 122 which results in the controller 126 re-calculating the duty cycle, causing the duty cycle to decrease, as shown at 156. In another embodiment of the disclosure, the node voltage Vx is monitored or sensed, and the duty cycle of the switch 118 is adjusted to reach the Vx_desire value identified above.

When the switch 118 is switching according to the dynamic duty cycle, the switch 118 turns on causing current Ictrl to conduct through $R_1$ and $R_2$, and when the switch 118 turns off, the current Ictrl no longer conducts through the switch, but instead operates to charge the capacitance 114 in the parallel path (i.e., the second branch). The value of the duty cycle dictates an average controlled current Ictrl with a slight ripple reflecting the switching. This is also reflected in the ripple in the Vx voltage as seen at 158 in FIG. 7. In one embodiment, the controller 126 continues to use the sampled value of Vrect from the sensor 122 to dynamically vary the duty cycle between times $t_1$ and $t_2$ to ensure that the change in power conduction ($\Delta P$) stays within the predetermined target power range. At time $t_2$, the load modulation signal period is discontinued by instructions received by the controller 126 (e.g., at an end of the extended beacon time period). At that time, the controller 126 turns off the switch 118.

Figure 8:
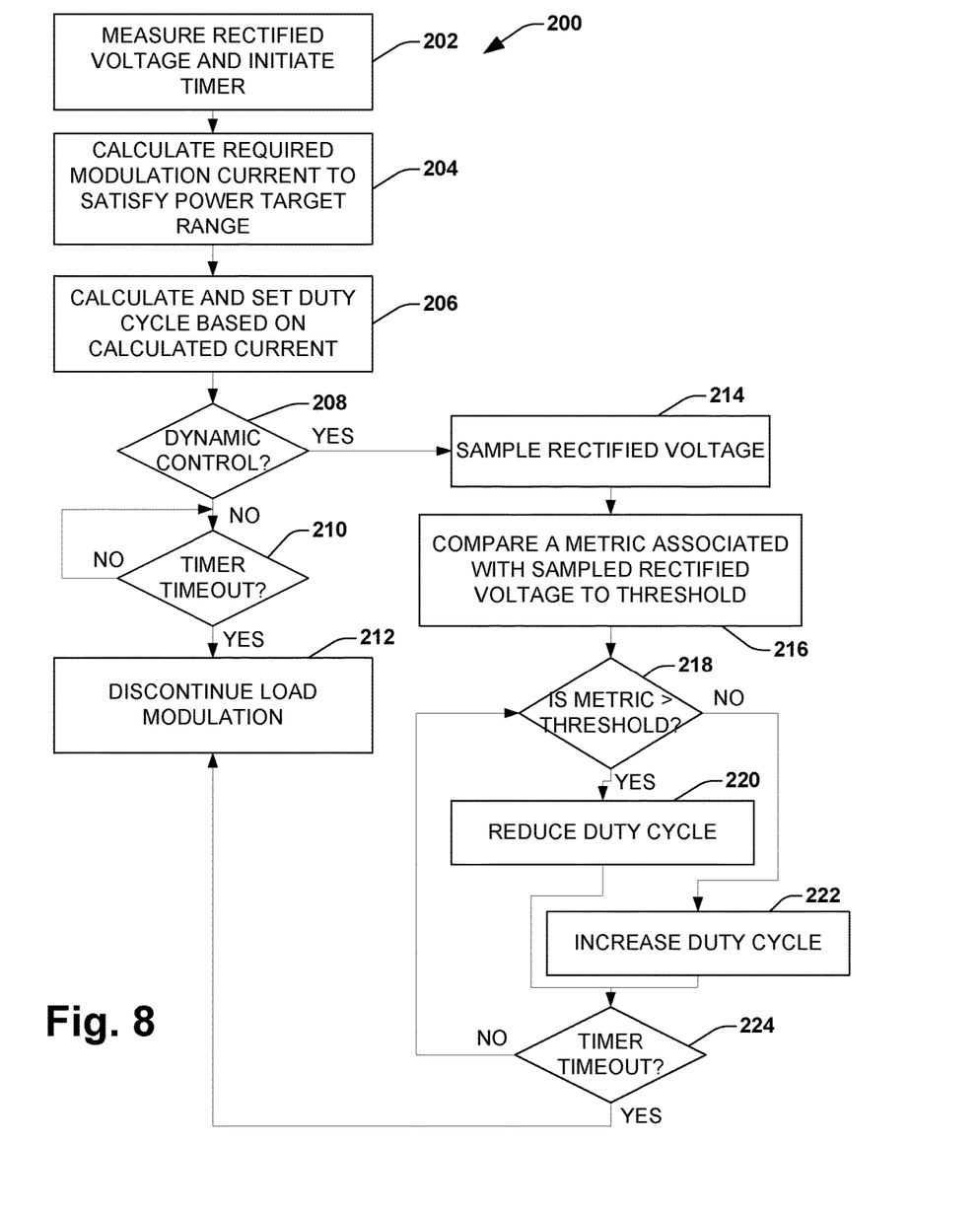
FIG. 8 is flow chart diagram illustrating a method for producing regulated load modulation signaling according to one embodiment.

FIG. 8 is a flow chart illustrating a method 200 of producing regulated load modulation signaling. While the method provided herein is illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

The method 200 in FIG. 8 begins, in one embodiment, at 202, wherein the rectified voltage is measured (e.g., Vrect) and a timer is initiated. In this embodiment the rectified voltage generated from a PRU transmission is measured, however, such voltage may alternatively comprise any variable supply voltage or variable voltage associated therewith. Further, the activation of the timer at 202 is associated with a prescribed signaling back pulse duration or data (i.e., multiple pulses) duration associated with the load modulation. In one embodiment the timer timeout period is associated with a time duration of an extended beacon signal, however, such timer timeout period may vary based on the type of load modulation signaling being performed and all such durations are contemplated by the present disclosure. In one embodiment the timer is associated with the controller 126 of FIG. 5, either integrated with the controller or discretely associated therewith. Further, in one embodiment the timer comprises a software based counter in the controller 126, however, a hardware timer such as a counter or other circuitry may be employed.

At 204 a calculation is made to determine a demodulation current during the load modulation that will satisfy a predetermined power target range. In one embodiment such a range may be dictated by a specification such as A4WP or another specification. Alternatively, the range maybe dictated by a customer or other performance criteria. In one embodiment the calculated current may be one that places an estimated change in power conduction due to the load modulation to be in the middle of the target power range, however, such a calculation may be based on other criteria. Further, the calculation at 204 may include determining a range of current during load modulation that will satisfy the predetermined target power range.

The method 200 proceeds to 206, wherein a duty cycle of driving a switch used for the load modulation is calculated. Such duty cycle calculation at 206 is based on the calculated modulation current and on the predetermined target power range. A query is made at 208 whether the subsequent duty cycle control during load modulation is dynamic. If the determination is made (via, for example, instructions provided to the controller 126) that the control will be static (NO at 208), the method 200 simply maintains the duty cycle of the switch (e.g., switch 118 of FIG. 5) at the initial calculated duty cycle for the entire time period dictated by the timer. At 210, when the timer timeout period has expired (YES at 210) the load modulation is complete at 212 and the controller 126 deactivates the switch 118.

Returning to act 208, if a determination is made that dynamic control will be employed (YES at 208), the method 200 proceeds to 214 and the rectified voltage is sampled or otherwise sensed. In one embodiment the rectified voltage is sensed in a continuous fashion; alternatively, the rectified voltage is periodically sampled, for example, using a latch or other type circuitry. At 216 a metric associated with the sampled or sensed rectified voltage is compared to a threshold. In one embodiment the metric is simply the sensed rectified voltage while in other embodiments the metric may be an average rectified voltage value calculated over multiple samples in a given time period as other processed value processed by the controller 126, for example associated with the rectified voltage.

At 218, if the metric exceeds a predetermined threshold (YES at 218) the duty cycle is reduced at 220, wherein the controller 126 provides a control signal 128 to the PWM circuit 120 that causes the drive signal 108 to have a reduced duty cycle. Alternatively, if the metric does not exceed the threshold (NO at 218) the duty cycle is increased at 222. In such an instance, the controller 126 makes the comparison, ascertains the comparison result, and provides a control signal 128 to the PWM circuit 120 that causes the drive signal 108 to have an increased duty cycle, thus affecting the switch 118, for example. The dynamic control then continues by continuing to compare the updated metric with the threshold and either increasing or decreasing the duty cycle in response thereto until the timer times out at 224 (YES at 224), in which case the load modulation is discontinued at 212. It should be noted that in one alternative embodiment, hysteresis may be employed in the metric comparisons at 218 and all such variations are contemplated as falling within the scope of the present disclosure.

In example 1 of the disclosure a load modulation circuit comprises a resonator circuit configured to resonate based on a received charging power and produce a resonance output signal based thereon, and a rectifier circuit configured to receive the resonance output signal and convert the resonance output signal to a rectified voltage signal. The load modulation circuit further comprises a sensor circuit configured to sense the rectified voltage signal and generate a control signal based on the rectified voltage signal and a target power range associated with a change in conducting power of the load modulation circuit during a load modulation, and a controllable current source circuit configured to generate a controlled current based on the control signal, wherein the controlled current modulates a load of the load modulation circuit while concurrently maintaining a change in total conducting power at an output of the rectified circuit within the target power range.

In example 2 of the disclosure, in the load modulation circuit of example 1 claim 1, wherein the sensor circuit comprises a pulse width modulation circuit configured to generate the control signal, wherein the control signal comprises a duty cycle based on the reduced voltage.

In example 3 of the disclosure, in the load modulation circuit of example 1, the sensor circuit further comprises a voltage divider circuit configured to generate a reduced voltage based on the rectified voltage signal, wherein the pulse width modulation circuit is configured to control the duty cycle of the control signal based on the reduced voltage.

In example 4 of the disclosure, in any of the examples 1-3, the sensor circuit is configured to sample the rectified voltage signal and determine a value of the rectified signal based thereon.

In example 5 of the disclosure, in example 4, the load modulation circuit further comprises a pulse width modulation circuit configured to vary the control signal based on the average value of the rectified voltage signal.

In example 6 of the disclosure, in example 5, the pulse width modulation circuit is configured to increase a duty cycle of the control signal if the average value is greater than a target threshold and reduce a duty cycle if the average value is less than a target threshold or another target threshold related thereto.

In example 7 of the disclosure, in example 1, in the modulation circuit the controllable current source comprises a first resistance having a first node coupled to an output of the rectifier circuit, and a second node, and a parallel circuit having a first branch comprising a first capacitance having a first node coupled to the second node of the first resistance, and a second node coupled to a predetermined potential. The controllable current source also comprises a second branch comprising a series coupled second resistance and a switch, wherein a first node of the second resistance is coupled to the second node of the first resistance, and a node of the switch is coupled to the predetermined potential, and wherein a control terminal of the switch is coupled to the control signal.

In example 8 of the disclosure, in example 7 a duty cycle of the control signal varies as a function of the rectified voltage signal, and the duty cycle of the control signal dictates a switching of the switch, thereby varying an effective resistance of the controllable current source as a function of the rectified voltage signal.

In example 9 of the disclosure, a method for producing regulated load modulation signaling is disclosed. The method comprises sensing a received voltage at a load associated with a load modulation, and determining a modulation current to satisfy a target power range based on the sensed received voltage. The method further comprises determining a duty cycle of a load modulation switch based on the determined modulation current, and driving the load modulation switch with the determined duty cycle.

In example 10 of the disclosure, the method of example 9 further comprises initiating a timer at a time associated with the driving of the load modulation switch, and continuing the driving of the load modulation switch until a timeout of the timer is detected, at which point the driving of the load modulation switch is discontinued.

In example 11 of the disclosure, in example 10 the timer comprises a counter and wherein the timeout of the timer comprises the counter reaching a predetermined count value.

In example 12 of the disclosure, the method of example 9 further comprises continuing to sense the received voltage during an entirely of a load modulation time period, and continuously or periodically determining an updated modulation current based on the target power range and an updated sensed received voltage. In addition, the method of example 9 also comprises continuously or periodically determining an updated duty cycle of the load modulation switch based on the determined updated modulation current, and driving the load modulation switch with the updated duty cycle.

In example 13 of the disclosure, in any of examples 9-12, sensing the received voltage comprises applying the received voltage across a voltage divider circuit having an internal node reflecting a fractionally amount of the received voltage, and continuously or periodically calculating a voltage associated with the received voltage based on a voltage at the internal node of the voltage divider circuit.

In example 14 of the disclosure, in any of examples 9-12, the received voltage comprises a rectified voltage in a power receive unit (PRU) in a wireless charging system.

In example 15 of the disclosure, in any of examples 9-12, driving the load modulation switch at the determined duty cycle maintains a change in power conduction of a load modulation circuit performing the load modulation within the target power range for an anticipated range of the received voltage.

In example 16 of the disclosure, a load modulation circuit comprises a sensor circuit configured to sense a load voltage associated with the load modulation circuit. The sensor circuit is further configured to generate a control signal based on the sensed load voltage and a target power range associated with a change in conducting power of the load modulation circuit during a load modulation. The load modulation circuit further comprises a controllable current source circuit configured to generate a controlled current based on the control signal, wherein the controlled current modulates a load of the load modulation circuit while concurrently maintaining a change in total conducting power of the load modulation circuit within the target power range.

In example 17 of the disclosure, in example 16 the sensor circuit comprises a pulse width modulation circuit configured to generate the control signal, wherein the control signal comprises a duty cycle based on the load voltage.

In example 18 of the disclosure, in example 16 the sensor circuit is configured to continuously or periodically measure the load voltage or a voltage associated therewith, and vary the control signal based on the load voltage or voltage associated therewith or a metric associated with such voltages.

In example 19 of the disclosure, in example 18, the sensor circuit comprises a pulse width modulation circuit that is configured to increase a duty cycle of the control signal if the measured voltage or metric is greater than a target threshold and reduce a duty cycle if the measured voltage or metric is less than a target threshold or another target threshold related thereto.

In example 20 of the disclosure, in any of examples 16-19, the controllable current source comprises a first resistance having a first node coupled to an input of the load modulation circuit, and a second node, and a parallel circuit having a first branch comprising a first capacitance having a first node coupled to the second node of the first resistance. The parallel circuit also comprises a second node coupled to a predetermined potential, and a second branch comprising a series coupled second resistance and a switch, wherein a first node of the second resistance is coupled to the second node of the first resistance, and a node of the switch is coupled to the predetermined potential, and wherein a control terminal of the switch is coupled to the control signal.

In example 21 of the disclosure, in example 20, the duty cycle of the control signal varies as a function of the load voltage, and the duty cycle of the control signal dictates a switching of the switch, thereby varying an effective resistance of the controllable current source as a function of the load voltage.

In example 22 of the disclosure, in any of examples 16-21, the load modulation circuit further comprises a resonator circuit configured to resonate based on a received charging power and produce a resonance output signal based thereon, and a rectifier circuit configured to receive the resonance output signal and convert the resonance output signal to a rectified voltage signal. The sensor circuit is configured to sense the rectified voltage signal as the load voltage and generate the control signal based on the rectified voltage signal and the target power range.

In example 23 of the disclosure, in example 22, the sensor circuit further comprises a voltage divider circuit configured to generate a reduced voltage based on the rectified voltage signal. The pulse width modulation circuit is configured to control the duty cycle of the control signal based on the reduced voltage.

In example 24 of the disclosure a circuit for producing regulated load modulation signaling is disclosed. The circuit comprises means for sensing a received voltage at a load associated with a load modulation, and means for determining a modulation current to satisfy a target power range based on the sensed received voltage. The circuit also comprises means for determining a duty cycle of a load modulation switch based on the determined modulation current, and means for driving the load modulation switch with the determined duty cycle.

In example 25 of the disclosure, in example 24, the circuit further comprises means for initiating a timer at a time associated with the driving of the load modulation switch, and means for continuing the driving of the load modulation switch until a timeout of the timer is detected, at which point the driving of the load modulation switch is discontinued.

In example 26 of the disclosure, in example 24, the circuit further comprises means for continuing to sense the received voltage during an entirely of a load modulation time period, and means for continuously or periodically determining an updated modulation current based on the target power range and an updated sensed received voltage. The circuit also comprises means for continuously or periodically determining an updated duty cycle of the load modulation switch based on the determined updated modulation current, and means for driving the load modulation switch with the updated duty cycle.

It should be understood that although various examples are described separately above for purposes of clarity and brevity, various features of the various examples may be combined and all such combinations and permutations of such examples is expressly contemplated as falling within the scope of the present disclosure.

Although the disclosure has been illustrated and described with respect to one or more implementations, alterations and/or modifications may be made to the illustrated examples without departing from the spirit and scope of the appended claims. Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the disclosure may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A load modulation circuit, comprising:
   a resonator circuit configured to resonate based on a received charging power and produce a resonance output signal based thereon;
   a rectifier circuit configured to receive the resonance output signal and convert the resonance output signal to a rectified voltage signal;
   a sensor circuit configured to sense the rectified voltage signal and generate a control signal based on the rectified voltage signal and a target power range associated with a change in conducting power of the load modulation circuit during a load modulation; and
   a controllable current source circuit configured to generate a controlled current based on the control signal, wherein the controlled current is to modulate a load of the load modulation circuit while concurrently maintaining a change in total conducting power at an output of the rectifier circuit within the target power range, wherein the controllable current source comprises:
      a first resistance having a first node coupled to an output of the rectifier circuit, and a second node;
      a parallel circuit having a first branch comprising a first capacitance having a first node coupled to the second node of the first resistance, and a second node coupled to a predetermined potential, and a second branch comprising a series coupled second resistance and a switch, wherein a first node of the second resistance is coupled to the second node of the first resistance, and a node of the switch is coupled to the predetermined potential, and wherein a control terminal of the switch is coupled to the control signal.

2. The load modulation circuit of claim 1, wherein the sensor circuit comprises:
   a pulse width modulation circuit configured to generate the control signal, wherein the control signal comprises a duty cycle based on a reduced voltage.

3. The load modulation circuit of claim 1, wherein the sensor circuit further comprises a sensor, wherein the sensor includes:
   a voltage divider circuit configured to generate a reduced voltage based on the rectified voltage signal,
   wherein the pulse width modulation circuit is configured to control the duty cycle of the control signal based on the reduced voltage.

4. The load modulation circuit of claim 1, wherein the sensor circuit is configured to sample the rectified voltage signal and determine a value of the rectified signal based thereon.

5. The load modulation circuit of claim 4, further comprising a pulse width modulation circuit configured to vary the control signal based on the average value of the rectified voltage signal.

6. The load modulation circuit of claim 5, wherein the pulse width modulation circuit is configured to increase a duty cycle of the control signal if the average value is greater than a target threshold and reduce a duty cycle if the average value is less than a target threshold or another target threshold related thereto.

7. The load modulation circuit of claim 1, wherein a duty cycle of the control signal varies as a function of the rectified voltage signal, and wherein the duty cycle of the control signal dictates a switching of the switch, thereby varying an effective resistance of the controllable current source as a function of the rectified voltage signal.

8. A method for producing regulated load modulation signaling, comprising:
   sensing a received voltage at a load associated with a load modulation;
   determining a modulation current to satisfy a target power range based on the sensed received voltage;
   determining a duty cycle of a load modulation switch based on the determined modulation current; and
   driving the load modulation switch with the determined duty cycle.

9. The method of claim 8, further comprising:
   initiating a timer at a time associated with the driving of the load modulation switch; and
   continuing the driving of the load modulation switch until a timeout of the timer is detected, at which point the driving of the load modulation switch is discontinued.

10. The method of claim 9, wherein the timer comprises a counter and wherein the timeout of the timer comprises the counter reaching a predetermined count value.

11. The method of claim 8, further comprising:
    continuing to sense the received voltage during an entirely of a load modulation time period;
    continuously or periodically determining an updated modulation current based on the target power range and an updated sensed received voltage;
    continuously or periodically determining an updated duty cycle of the load modulation switch based on the determined updated modulation current; and
    driving the load modulation switch with the updated duty cycle.

12. The method of claim 8, wherein sensing the received voltage comprises:
    applying the received voltage across a voltage divider circuit having an internal node reflecting a fractionally amount of the received voltage; and
    continuously or periodically calculating a voltage associated with the received voltage based on a voltage at the internal node of the voltage divider circuit.

13. The method of claim 8, wherein the received voltage comprises a rectified voltage in a power receive unit (PRU) in a wireless charging system.

14. The method of claim 8, wherein driving the load modulation switch at the determined duty cycle maintains a change in power conduction of a load modulation circuit performing the load modulation within the target power range for an anticipated range of the received voltage.

15. A load modulation circuit, comprising:
    a sensor circuit configured to sense a load voltage associated with the load modulation circuit, wherein the sensor circuit is further configured to generate a control signal based on the sensed load voltage and a target power range associated with a change in conducting power of the load modulation circuit during a load modulation; and
    a controllable current source circuit configured to generate a controlled current based on the control signal, wherein the controlled current modulates a load of the load modulation circuit while concurrently maintaining a change in total conducting power of the load modulation circuit within the target power range, wherein the controllable current source comprises:
- a first resistance having a first node coupled to an input of the load modulation circuit, and a second node;
- a parallel circuit having a first branch comprising a first capacitance having a first node coupled to the second node of the first resistance, and a second node coupled to a predetermined potential, and a second branch comprising a series coupled second resistance and a switch, wherein a first node of the second resistance is coupled to the second node of the first resistance, and a node of the switch is coupled to the predetermined potential, and wherein a control terminal of the switch is coupled to the control signal.

16. The load modulation circuit of claim 15, wherein the sensor circuit comprises:
- a pulse width modulation circuit configured to generate the control signal, wherein the control signal comprises a duty cycle based on the load voltage.

17. The load modulation circuit of claim 15, wherein the sensor circuit is configured to continuously or periodically measure the load voltage or a voltage associated therewith, and vary the control signal based on the load voltage or voltage associated therewith or a metric associated with such voltages.

18. The load modulation circuit of claim 17, wherein the sensor circuit comprises a pulse width modulation circuit that is configured to increase a duty cycle of the control signal if the measured voltage or metric is greater than a target threshold and reduce a duty cycle if the measured voltage or metric is less than a target threshold or another target threshold related thereto.

19. The load modulation circuit of claim 15, wherein a duty cycle of the control signal varies as a function of the load voltage, and wherein the duty cycle of the control signal dictates a switching of the switch, thereby varying an effective resistance of the controllable current source as a function of the load voltage.

* * * * *